(No Model.)
W. B. CULVER.
SHAFT COUPLING.
No. 373,443. Patented Nov. 22, 1887.
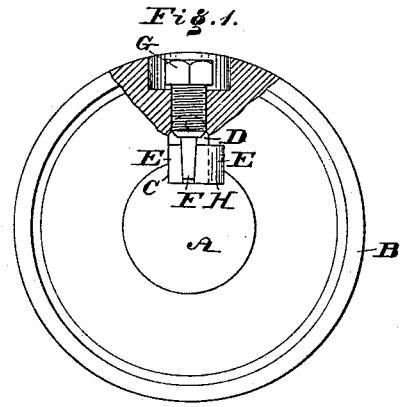
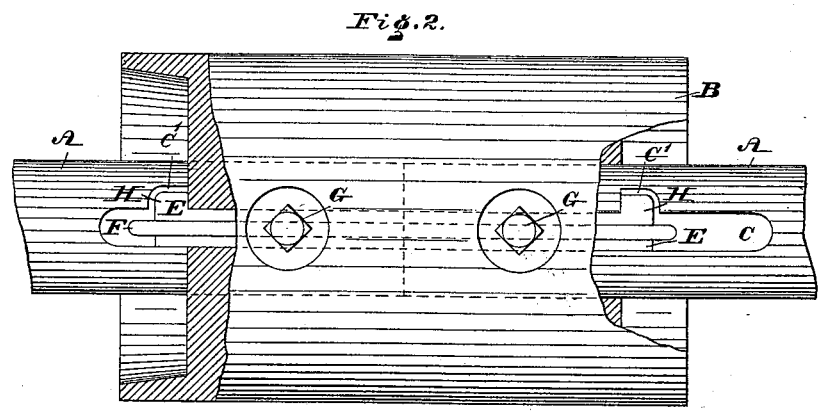
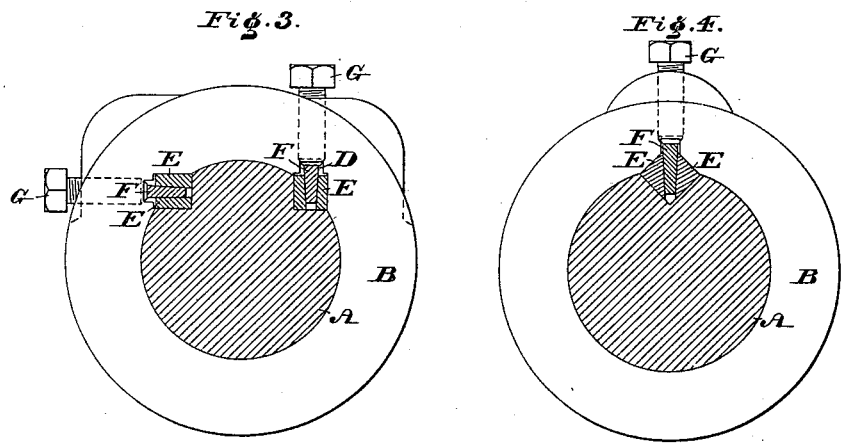
WITNESSES:
Th. Rolle.
Edw. Llouville.
INVENTOR:
Willard B. Culver
BY John A. Wiedersheim
ATTORNEY.

United States Patent Office.

WILLARD B. CULVER, OF PITTSTON, PENNSYLVANIA, ASSIGNOR OF ONE-THIRD TO J. B. SCHIFFER, OF SAME PLACE.

SHAFT-COUPLING.

SPECIFICATION forming part of Letters Patent No. 373,443, dated November 22, 1887.

Application filed October 29, 1886. Serial No. 217,508. (No model.)

*To all whom it may concern:*

Be it known that I, WILLARD B. CULVER, a citizen of the United States, residing at Pittston, in the county of Luzerne, State of Pennsylvania, have invented a new and useful Improvement in Couplings for Shafts, Pulleys, Gearing, &c., which improvement is fully set forth in the following specification and accompanying drawings, in which—

Figure 1 represents an end view, partly broken away, of a shaft-coupling embodying my invention. Fig. 2 represents a side elevation thereof, partly broken away. Figs. 3 and 4 represent sectional views of modifications thereof.

Similar letters of reference indicate corresponding parts in the several figures.

My invention consists of a coupling for shafts or shafting, formed of gibs and a tightening-key, as will be hereinafter fully set forth.

Referring to the drawings, A represents two pieces or lengths of shafts to be coupled, and B represents the coupling or coupling-sleeve thereof, said shafts and coupling, excepting the features of my invention applied thereto, being of usual form.

The shafts are formed with longitudinally-extending grooves C, with recesses C' extending laterally therefrom, and the inner periphery of the coupling is formed with a longitudinally-extending groove, D, said grooves receiving the fastening or coupling devices, the same consisting of gibs E and wedging-key F. To the coupling or sleeve B are fitted screw-bolts G, whose points are adapted to bear against the head of the key F.

The gibs E consist of pieces of suitable metal, one of the gibs, in Figs. 1 and 2, having its ends hooked, as at H, said ends entering the recesses C' for preventing longitudinal separation of the shafts. When the hooked gib is located in the grooves C D and its ends are fitted in the recesses C', the other gib is located in the opposite sides of the grooves, so that a space exists between the two gibs. The key F is now introduced into the grooves between said space, and the bolts G are properly turned, whereby they bear against the key F and force the gibs in opposite directions and tighten them against the walls of the grooves. Now, as the gibs are wedged in said grooves, the shafts are reliably coupled without liability to slip or separate. When the shafts are to be uncoupled, the bolts G are unscrewed, whereby the key is released of the holding action thereof. The key is then withdrawn through the grooves, whereby the gibs are relieved, and they may also be withdrawn, thus disconnecting the sleeve and shafts without hammering.

In Fig. 3 the bolts G pass through the coupling in directions tangential to the shaft, the grooves in the shaft and coupling occupying positions in relation to said bolts, so that the wedging-key is engaged by said bolts. In Fig. 4 the gibs are triangular in cross-section and the grooves similarly shaped. In this case the gibs present greater amount of metal in the direction of their width, but the operation is similar to that hereinbefore stated.

For securing a pulley or gear-wheel to its shaft or axle said pulley or gear-wheel and the shaft are provided with grooves C D, which receive the gibs E and wedging-key F, the latter being tightened by screws or screw-bolts G in the bodies or hubs of the pulley.

I am aware that it is not new to secure a wheel or pulley upon a shaft by fastening the same thereto by means of gibs inserted in grooves in said wheel and shaft, and inserting a key between the said gibs, the key being held in place by screws working in the wheel; but I am not aware that two shafts have been coupled as herein set forth, the grooves of the shafts having recesses extending laterally wherein the hooked ends of one of the gibs rest, thus preventing separate longitudinal motion or play of the two sections.

Having thus described my invention, what I claim as new, and desire to secure by Letters Patent, is—

1. The shafts A A, each having a longitudinal groove, in combination with the gibs E, a key, a coupling-sleeve, and bolts passing through said coupling-sleeve and wedging said gibs, substantially as described.

2. The shafts A A, each having a longitudinal groove with a lateral recess, in combination with a gib, E, having hook-ends, a key, a coupling-sleeve, and bolts G passing through said coupling-sleeve and bearing against said key, substantially as described.

3. The shafts A A, each having a longitudinal groove, C, with a lateral recess, C', in combination with the coupling-sleeve B, having longitudinal groove D, the gibs E, one of which has hook-ends H, the key F, and the bolts G, substantially as and for the purpose set forth.

WILLARD B. CULVER.

Witnesses:
J. N. THOMAS,
LEWIS W. LE GRAND.